Figures 16, 17:

Aug. 16, 1966    L. W. BURCH ET AL    3,266,317
THERMO-RESPONSIVE DEVICES
Filed July 26, 1963    2 Sheets-Sheet 1
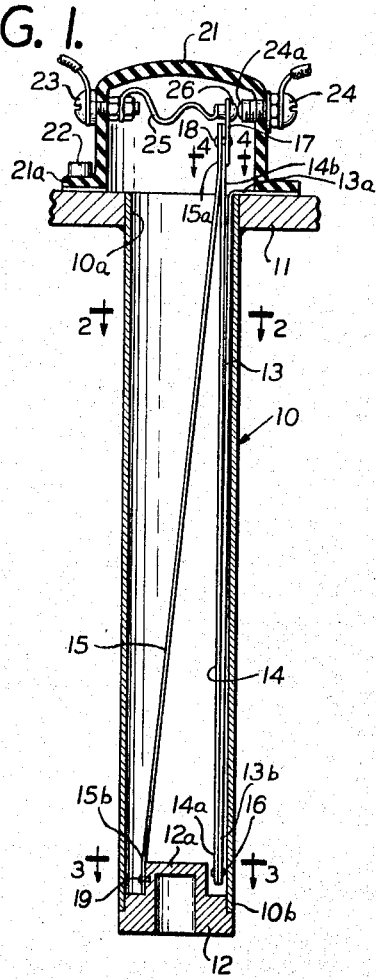
FIG. 1.
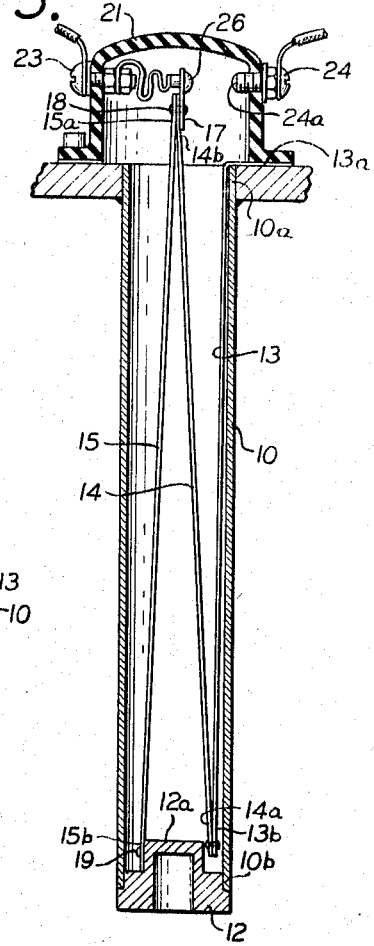
FIG. 5.
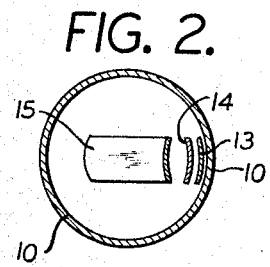
FIG. 4.
FIG. 2.
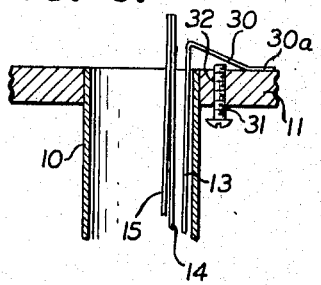
FIG. 6.
FIG. 3.
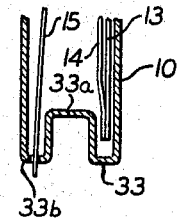
FIG. 7.
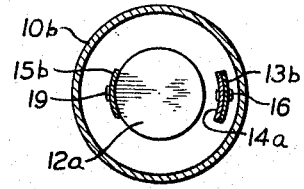
INVENTORS
LYNDON W. BURCH
HADLEY K. BURCH
BY ROBERT HOCKFIELD
ATTORNEY.

Aug. 16, 1966  L. W. BURCH ET AL  3,266,317
THERMO-RESPONSIVE DEVICES
Filed July 26, 1963  2 Sheets-Sheet 2
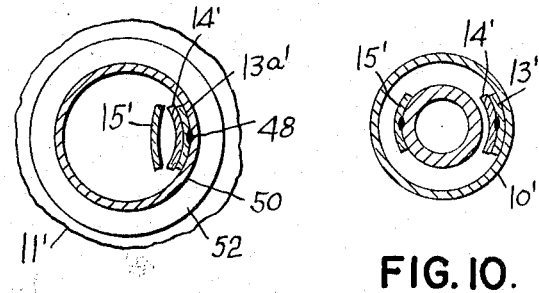
FIG.9.  FIG.10.
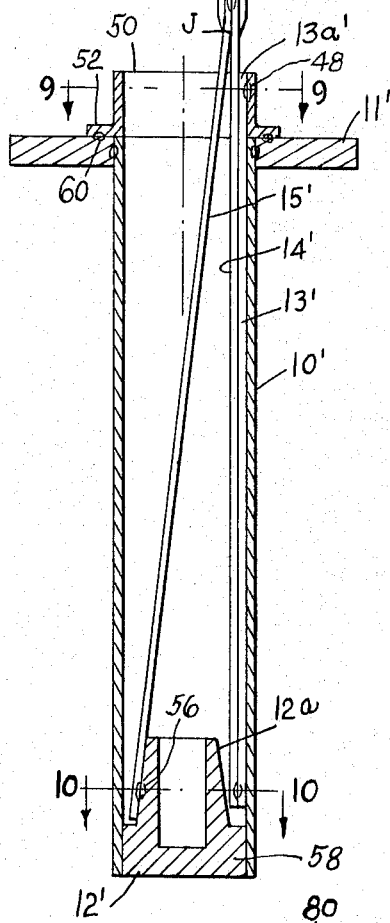
FIG.8.
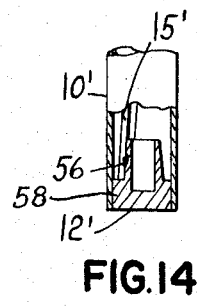
FIG.11.
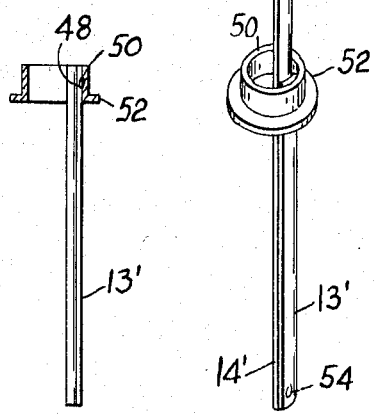
FIG.12.
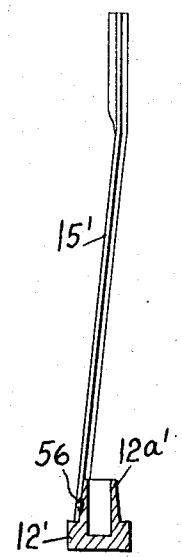
FIG.13.
FIG.14.  FIG.15.
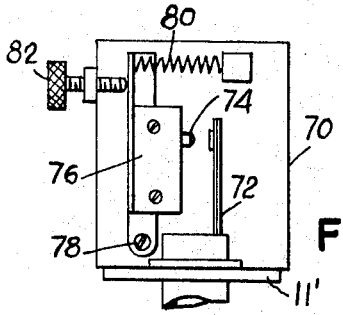

United States Patent Office 3,266,317
Patented August 16, 1966

3,266,317
THERMO-RESPONSIVE DEVICES
Lyndon W. Burch, 3 River St., Boston, Mass., and
Hadley K. Burch, Pittsfield, Vt.
Filed July 26, 1963, Ser. No. 298,813
13 Claims. (Cl. 73—363.3)

This is a continuation-in-part of application Serial No. 69,147, filed November 14, 1960, now abandoned.

This invention relates to thermally responsive actuators and, more particularly, pertains to a new and improved thermo-responsive device of the differential expansion type. Such actuators have many applications but, for convenience, the present invention will be shown and described in association with electric switches.

While thermo-responsive, differential expansion actuators of various types have been available heretofore, these suffer from one or more of a number of deficiencies. For example, the device may not provide sufficient movement with adequate thrust to operate the actuated mechanism reliably, and this is particularly true with respect to operating snap mechanisms in which the actuator must overcome the force of a spring in response to only a slight change in temperature. Some of the prior devices have component parts which wear upon one another and after a period of operation, the calibration may undesirably change or it may, in some instances cause a dangerous temperature drift. Other prior thermo-responsive actuators are not rugged enough to perform effectively and consistently in an environment of extreme vibration, such as in a moving vehicle. Finally, many devices of the past were comprised of a relatively great number of component parts or parts which required complicated manufacturing techniques and thus were too expensive for many applications.

It is, therefore, an object of the present invention to provide a new and improved thermo-responsive device which at least lessens the above disadvantages.

Another object of the present invention is to provide a new and improved thermo-responsive device which provides greater actuating movement with adequate force than heretofore possible, which is relatively rugged, simple and inexpensive to construct and yet is entirely efficient and reliable in operation.

A still further but very important object is to provide a thermo-responsive actuator which can operate a snap mechanism or switch in response to only a slight change in temperature.

A thermo-responsive device constructed in accordance with the invention comprises four elements connected together alternately at their ends to define a generally M shaped array. The outer pair of elements have free-end portions connected together, and at least one of the elements has a coefficient of thermal expansion different from that of another element.

According to one aspect of the invention, i.e. for immersion, the joined ends of the third and fourth elements protrude outwardly from enclosure by the first element at which protrusion the last connection can be made for assembly, these protruding parts being advantageously exposed for use with devices to be actuated. According to another aspect of the invention for actuating snap mechanisms the third as well as the first elements is of high thermal coefficient material and is straight and has a stiffening cross-section.

In the drawings:
FIG. 1 is a view in longitudinal cross-section partially diagrammatic, of a thermo-responsive device embodying the present invention;
FIGS. 2, 3 and 4 are cross-sectional views of the device taken along lines 2—2, 3—3 and 4—4 of FIG. 1;
FIG. 5 is a view of the device similar to FIG. 1, but illustrating it in a different operating condition; and
FIGS. 6 and 7 represent modifications which may be made to the device shown in FIG. 1;
FIG. 8 is a view in longitudinal cross-section, partially diagrammatic, of a preferred combination of a thermo-responsive device and a snap-actuating switch;
FIG. 9 is a transverse cross-section taken on line 9—9 of FIG. 8 showing the shaped transverse profile of the four elongated elements of the actuator;
FIG. 10 is a cross-sectional view taken on line 10—10 of FIG. 8 showing the relationship of the elongated elements at the bottom of the actuator;
FIGS. 11, 12, 13, 14 and 15 show successive assembly steps for the actuator of FIG. 8;
FIG. 16 is a transverse cross-section on line 16—16 of FIG. 8 showing the form of the pressing member portion of the actuator; and
FIG. 17 is a side view of the top of the actuator showing in greater detail the relationship of the snap-actuating switch with respect to the actuator.

As shown in FIG. 1 of the drawing, a thermo-responsive actuator in accordance with the invention comprises an elongated, tubular element 10 constructed of a metal having a given high coefficient of thermal expansion. Since the tubular element 10 forms a protective outer housing for the remainder of the elements of the device, to be described hereinafter, it is preferably comprised of a material having resistance to oxidation and corrosion and sufficiently rugged. For example, the material may be brass; however, the invention is not limited to any particular material for element 10.

Tubular element 10 is open at one end 10a and is attached, as by welding or brazing, to a mounting flange constructed of brass, steel, or any other suitable material. The remaining end 10b of tubular element 10 is closed by a cylindrical plug 12 which may be constructed of brass and suitably fixed in place as by welding or brazing. A portion 12a of plug 12 within tubular element 10 of reduced diameter is employed for purposes to be described in the discussion to follow.

Located within tubular element 10 is a straight element 13 having a low coefficient of thermal expansion, substantially smaller than that of element 10. Element 13 may be constructed of a suitable alloy of iron and nickel commonly known as Invar and is in the form of an elongated, transversely curved strip coextensive with element 10 and conformed to the inner wall of element 10, as may be seen in FIG. 2.

At its end adjacent to the open end 10a of element 10, element 13 has a relatively flat portion that is bent at approximately 90° so as to overlie a portion of flange 11 where it is appropriately secured by welding or clamping. Thus, adjacent end portions 10a and 13a of elements 10 and 13 are secured together.

A third element 14 is disposed within tubular element 10 and has a high thermal coefficient of expansion larger than that of element 13, substantially equal to that of element 10. For example, element 14 may be constructed of brass or of an alloy of 72 percent manganese, 18 percent copper and 10 percent nickel, and is in the form of a straight, elongated, transversely curved strip that conforms to the configuration of element 13. In other words, the elements 10, 13 and 14 are disposed in nesting relation, as may be best seen in FIG. 2. One end portion 14a of element 14 is secured to the adjacent end portion 13b of element 13, as by welding or by a rivet 16 as shown. The portions 13b and 14a of elements 13 and 14 thus joined together are disposed within the annulus defined by reduced portion 12a of plug 12 and the inner wall of tubular element 10. The size of this annulus is selected so as to limit or restrict movement of the joined ends of elements 13 and 14 transverse to the direction of tubular element 10, but permitting movement in that direction.

The remaining end of element 14 extends out of the open end of tubular element 10 and has a flattened portion 14b, seen best in FIG. 4, for the purpose of being secured to one end 15a of a fourth element 15 and to a contact-carrier plate 17 by welding or by a rivet 18, as shown. Element 15 has a low coefficient of thermal expansion, substantially smaller than that of element 14 and may be constructed of Invar or other low coefficient of expansion material. It is in the form of an elongated, transversely curved strip extending into tubular element 10, and its remaining end portion 15b is secured to reduced portion 12a of plug 12 by welding or by a rivet 19, as shown. Thus, end portions 10b and 15b of elements 10 and 15 are secured to one another.

In selecting the thickness and configuration for the various elements, certain operating conditions should be observed. Element 10 should be rigid and resistant to bending and of sufficient ruggedness to protect the assembly from physical damage. In general, element 14 should be stiffened against bending, while element 15 or its end portions 15a or 15b should permit bending so that the junction between portions 14b and 15a of elements 14 and 15 is movable in a direction transverse to the direction of element 10.

As an example of the type of mechanism which may be actuated by a thermo-responsive device embodying the invention, there is shown a cylindrical housing 21 of any suitable electrically insulating material which is mounted over the open end 10a of tubular element 10 with its interior in communication with the interior of element 10 and receiving portions 14b and 15a of members 14 and 15. The housing has a mounting flange 21a which is secured to flange 11 by screws, such as the one designated by numeral 22, and which also serve to clamp portion 13a of element 13 in place.

Opposed electrical terminals 23 and 24 extend through the wall of the housing 21. A flexible wire 25 extends from terminal 23 to a contact 26 which is secured to contact-carrier plate 17, thus completing an electrical connection between terminal 23 and contact 26. The inner extremity of terminal 24 constitutes another contact 24a with which contact 26 is operatively associated to form a normally-closed electric switch.

In operation, the assembly of elements are in the position described above and as shown in FIG. 1 for a given ambient temperature. When the temperature to which tubular element 10 is exposed increases, both elements 10 and 14 expand, and their expansion is substantially greater than that of elements 13 and 15. This produces compression in elements 10 and 14 and tension in elements 13 and 15. Elements 13 and 14 pivot relative to one another, and element 15 pivots at its junction 15b with flange 12a. Thus, the junction of elements 14 and 15 (which carries contact 26) moves to the left and may attain a position such as illustrated in FIG. 5. This, of course, separates contacts 24a and 26, thereby interrupting any electrical circuit (not shown) that may be connected to terminals 23 and 24. It is evident that the amount of movement is related to the change in temperature. When the temperature decreases to or below the initial value, the condition of FIG. 1 is re-established.

It has been found in practice that a thermo-responsive device constructed in accordance with the present invention provides more movement than heretofore possible with prior devices of comparable size and yet affords adequate thrust for many applications. Moreover, since there are no parts which wear upon one another in operation or loosely mounted elements, reliable actuation with precisely maintained calibration is achieved over long periods and under adverse conditions as, for example, imposed by extreme vibration. Further, from an inspection of FIGS. 1–5, it is obvious that a thermally responsive actuator embodying the present invention is relatively simple and inexpensive to construct.

To prevent actuation until a prescribed temperature is attained, the structure of FIG. 1 may be modified in the manner illustrated in FIG. 6. For this purpose element 13 is slightly longer than in FIG. 1 and its upper end includes a portion 30 which is bent at an angle to the body of the element greater than 90°. The extremity 30a of portion 30 is welded to flange 11 and an adjusting screw 31 is threaded into an opening 32 in the flange adjacent to portion 30. In this arrangement an initial increase in temperature produces expansion of the elements as described in connection with FIGS. 1–5; however, no transverse displacement of the junction of elements 14 and 15 occurs until portion 30 engages the upper end of screw 31. Obviously, the position of screw 31 determines at what temperature transverse displacement occurs.

Instead of using plug 12 as shown in FIG. 1, tubular element 10 may have an integral end closure 33 as shown in FIG. 7. A central portion 33a of the closure is deformed inwardly and functions in the same manner as reduced portion 12a and an extension of element 15 passes through a small opening 33b in closure 33 where it may be welded in place.

In accordance with the present invention, immersion type thermo-responsive actuators, of the type employing a tube or similar enclosure may be assembled in a unique and highly convenient manner. To this end, elements 13 and 14 are placed adjacent to one another and portions 13b and 14a thereof are secured together preferably as by welding or by riveting as a sub-assembly. Next, elements 13 and 14 are placed within tubular element 10 and portion 13a is secured to flange 11 preferably by welding and is thus secured to portion 10a of element 10. Element 15 is then placed in position with end portion 15a adjacent to end portion 14b of element 14 and end portion 15b extending through opening 33b (FIG. 7). Portion 15b is secured in place, preferably by welding and after the position of end portion 15a of element 15 is adjusted relative to end portion 14b of element 14 so as to provide a desired position for the junction of end portions 14b and 15a, in a direction transverse to the general direction of element 10, these end portions are secured to one another preferably by welding. With this mode of construction, the angular position of elements will always be uniform at ambient temperatures and the final weld is located away from the tube so that adverse effects on the position of the junction just mentioned due to the heat of welding are eliminated. Alternately, if desired, element 15 may first be placed within tube 10 and secured in position. Thereafter, sub-assembly 13, 14 is placed within the tube 10 and portion 13a is secured to flange 11. Finally, portions 14b and 15a are welded together.

The protrusion of the joined elements 14 and 15 beyond the tube not only simplifies the assembly of the actuator and enables the final connection to be made by a weld without affecting the thermal condition of the elements. The protrusion also enables the elements to be placed in any desired lateral position at ambient conditoins so that the actuation temperature can be definitely established at any point within a considerable range.

Also the unique protrusion enables numerous types of standard switches and valves to be connected easily and without special adaption to the actuator, a very great advantage over the previous switch devices that had to fit within the tube.

Because of the substantial movement and force obtainable with the actuator of FIG. 1, particularly attributable to both the compression elements, the third element 14 as well as the first element 10 being formed of high thermal coefficient material, and with the third element being straight and stiffened against bending by its shaped transverse cross-section, the actuator of FIG. 1 is in some instances capable of actuating snap mechanisms. But markedly better performance can be achieved according to the embodiment of FIGS. 10–17 to which reference is now made. The actuator of this embodiment is an all welded construction in which the second, third and fourth elements, 13', 14' and 15', respectively, are substantially straight with no substantial bends from their respective lengthwise axes, the third element 14' being absolutely straight. Unlike the embodiment of FIG. 1, the second element 13' has a straight extension 13a' so that not even here is a bend from the lengthwise axis introduced which is found to greatly increase the power of the device, so essential for snap mechanisms. All of the elements have stiffened cross-sections (FIG. 9) in the preferred U form, it being understood that for simplicity FIGURE 8 does not show this, and is to that extent diagrammatic. Other features of this embodiment can best be understood in connection with a description of their assembly.

As a first assembly step, referring to FIG. 11, the second, low coefficient of expansion element 13' is welded at 48 to a collar member 50, the collar member having an opening corresponding to the diameter of the first tubular element 10' and having a flange 52. As a second step, referring to FIG. 12, the third, high coefficient of expansion element 14' is welded at 54 to the bottom of the second element 13' in a nested relationship, with the upper portion of element 14' extending substantially beyond the collar 50. As seen in this figure and in FIGS. 9 and 10, the elements 13' and 14' are both absolutely straight. As a third step, referring to FIG. 13, the fourth low coefficient of expansion element 15', of substantially identical extent to that of the third element 14', has a side of its bottom portion welded at 56 to the upwardly tapering extension 12a' of a plug 12'. As a fourth step, referring to FIG. 14, the plug 12' and element 15' are inserted within the tubular element 10' and welded thereto at 58. As a fifth step, referring to FIG. 15, the tubular element 10' equipped with a mounting flange 11' next receives the assembly of FIG. 12, with the third and fourth elements 14' and 15' extending together out of the collar 50. As a sixth step, the collar 50 is welded to flange 11' at 60 whereby, referring to FIG. 10, the bottom welded ends of elements 13' and 14' are confined within the space defined by the inner wall of tube 10' and the wall of the tapered extension 12a' of the plug. Then as a final step, referring still to FIG. 15, two electrodes 60' are brought together on opposite sides of the protrusions of the third and fourth elements 14' and 15' and a stitch weld is applied beginning at the point shown, to the end, see FIG. 8, completing the actuator structure. Referring to FIG. 16, the end portions of elements 14' and 15' are flattened at their outer edges for receiving the stitch weld 62, but the central portions are curved away from each other so that the over-all transverse profile of the extension is nonplanar, shaped for providing a very stiff pressing member by which snap switches can be actuated. Referring to FIG. 15, it must be observed that at the time of the last assembly step none of the elements are under stress and the location of the juncture J between the outer ends of elements 14' and 15' relative to the axis of the tube can be selected precisely, and then the weld can be applied instantaneously without affecting in any substantial way the relationship of the elements. Thereby an exact ambient location of the entire device can be established which permits easy calibration, and over a substantial range the precise thermal characteristics of the actuator can be determined merely by selection of the distance of the juncture from the center of the tube axis.

In the manufacture of the complete combination, a snap switch support 70 is mounted on flange 11' with the stitch welded portions of elements 14' and 15', that forms the pressing member 72, positioned to engage button 74 to cause the snap switch 76 to snap to its over-center position. The snap switch itself is pivotally mounted on axis 78 to support 70 so as to move toward and away from the pressing member 72. A retainer spring 80 biases the switch away from the pressing member and an adjustment screw 82 is provided to overcome the force of the spring and locate the button 74 in any desired position, whereby the temperature of actuation of the snap-acting switch can be varied.

With this actuator it is possible to achieve an actuating force in excess of 250 grams with movement in excess of over .001 inch per degree temperature change in a reliable and low-cost device. Accordingly, snap switches can now be operated by simple immersion thermostats to make better electrical contact and to extend the life of the contact elements over that of the prior art creep action switches. As applied to snap action switches, it is crucial to the invention that the elements be as straight as possible with the high coefficient of expansion element 14' extremely straight, and that the lightweight elements 13', 14' and 15' be stiffened against bending by the shape of their cross-sections. To achieve both the rigidity and straightness, it is advantageous to use the nesting concept as earlier described, and for most efficient actuation of snap switches the pressing member portion of the outer ends of the third and fourth elements should be stiffened as described, though the precise forms of the cross-sections can be varied to various curvatures and channel forms within the teachings of the invention, the term "structural" cross-section being used herein to denote these forms. By joining discrete members together entirely by welds (or the equivalent fused means such as silver soldering and brazing) a low-cost structure is achieved that has extremely high power and movement.

From the foregoing description, it may be appreciated that a thermo-responsive device according to the present invention may include a transversely curved strip-like carrier element in place of tubular element 10. This, of course, may permit the other elements to respond more readily to temperature changes. In general, as in FIGS. 1–5, the four elements are connected together to define a generally M-shaped array with the outer pair (elements 10 and 15) having their free ends connected together. Further, elements 13, 14 and 15 may be mounted on a rigid flat carrier plate of a material having a high coefficient of expansion, such as brass. For such a configuration, portions 13a and 15b are connected to the plate by transverse pins. It is evident that the plate functions as elements 10 and 12 and thus the term M-shaped array is deemed to be descriptive of this configuration. Although the coefficients of thermal expansion for the various elements in the illustrative embodiment of the invention are in a given relationship, a reverse relationship is also operative, i.e., the coefficients of elements 10 and 14 may be low and the coefficients of elements 13 and 15 may be high, elements 13 and 15 then being the compression members.

While particular embodiments of the present invention have been shown and described, it is apparent that changes or modifications may be made without departing from this invention in its broader aspects and, therefore, the aim in the appended claims is to cover all such changes and modifications as fall within the true spirit and scope of this invention.

What is claimed is:

1. A thermo-responsive device comprising first, second, third and fourth elements of elongated configuration disposed in the named order in, at least in part, coextensive relation to one another, said first element enclosing said second said third and said fourth elements at least in part, at least one of said elements having a coefficient of thermal expansion different from that of another of said elements, a connection between one end portion of said first element and an adjacent end portion of said second element, a connection between the remaining end portion of said second element and an adjacent end portion of said third element, a connection between the remaining end portion of said third element and an adjacent end portion of said fourth element, said remaining end portion of said third element and said adjacent end portion of said fourth element extending out of said one end portion of said first element, and a connection between the remaining end portions of said first and said fourth elements, the junction between said third and said fourth elements being movable in a direction transverse to the general direction of said first element.

2. A thermo-responsive device according to claim 1 wherein said first and third elements are compression elements, having a high coefficient of thermal expansion, substantially higher than that of said second and fourth elements and wherein said first and third elements are each stiffened against bending in the direction of actuating movement by the profile of their transverse cross-sections.

3. A thermo-responsive actuator according to claim 2 wherein said first, second and third elements are of curved configuration in transverse cross-section and generally conform with one another, enabling them all to be substantially straight while stiffened.

4. A thermo-responsive actuator comprising a first, tubular element having a given high coefficient of thermal expansion, a second element having a low coefficient of thermal expansion substantially smaller than said given coefficient, having one end portion adjacent to an end portion of said first element secured thereto and disposed within said first element, a third element having a high coefficient of thermal expansion larger than said low coefficient, having one end portion adjacent to the remaining end portion of said second element secured thereto and disposed, at least in part, within said first element, a fourth element having a low coefficient of thermal expansion smaller than said coefficient of said third element, having one end portion adjacent to the remaining end of said third element secured thereto and disposed, at least in part, within said first element, said one end portion of said fourth element and said remaining end portion of said third element extending out of the first-mentioned end portion of said first element, and means for securing the remaining end portions of said first and said fourth elements to one another.

5. A thermo-responsive actuator according to claim 4 wherein said second and said third elements are of curved configuration in transverse cross-section for stiffening and wherein said first, said second, and said third elements are disposed in generally nesting relation to one another.

6. A thermo-responsive actuator according to claim 4 further comprising means for limiting transverse movement of said one end portion of said third element and said remaining end portion of said second element relative to the general direction of said first element, but permitting movement thereof in said direction, said means comprising a plug mounted in the end of said tubular element having an inwardly extending portion spaced from the wall of said tubular element, said end portions of said third and second elements confined in the space thereby defined.

7. A thermo-responsive actuator according to claim 4 wherein said second element is rigidly secured to said first element but deflectable relative thereto, further comprising adjustably fixed stop means connected to the first-mentioned portion of said first element and disposed for engagement by said one end portion of said second element.

8. A thermo-responsive actuator for snap-actuating mechanisms comprising a multiplicity of at least four elongated, discrete elements joined rigidly alternately at their ends, the outer elements being also joined together at their remaining ends, the first element being a rigid carrier member and having a high coefficient of thermal expansion, the second and fourth elements having a low coefficient of thermal expansion and the connected ends of said second and third elements restrained from free lateral movement, said third element having a high coefficient of thermal expansion and being straight without bends from its lengthwise axis throughout its operative length while having a structural cross-section, shaped to stiffen said element against bending under lengthwise compressional stress applied by said second and fourth elements, whereby the force of thermal expansion of said first and third elements can move the joined ends of said third and fourth elements to actuate a snap-actuating mechanism in response to small change in temperature.

9. The actuator of claim 8 wherein said first element comprises a tube adapted to protect the elements from an environment into which the actuator is to be immersed, and said joined ends of said third and fourth elements which are lastly joined in the assembly of said actuator protrude from said tube.

10. A thermo-responsive actuator comprising a multiplicity of at least four elongated elements joined alternately at their ends, the outer elements being also joined together at their remaining ends, the first element being a rigid carrier member and having a high coefficient of thermal expansion, the remaining elements comprising a zig-zag amplifying assembly having both tensional and compressional regions, said assembly adapted with temperature change to move laterally and operate a control, wherein said elements forming said zig-zag amplifying assembly are discrete members which are straight when in unstressed condition, said discrete members being joined together by rigid fastening of corresponding end portions thereof facewise together, said members in the tensional as well as compressional regions having their general widthwise direction lying substantially at right angles to the direction of lateral movement of said assembly while having transverse cross-section profiles constructed to stiffen said members against bending in said direction of lateral movement.

11. A thermo-responsive actuator comprising four elongated elements joined alternately at their ends, the outer elements being also joined together at their remaining ends, at least one of the elements having a coefficient of thermal expansion substantially different from the others, the first element being a rigid tubular member having first and second ends, the remaining elements comprising a zig-zag amplifying assembly, wherein said second, third and fourth elements are discrete members, said second element rigidly joined face-to-face to the inside of a mounting member at a first fused joint, said mounting member rigidly joined to the first end of said tubular member, the opposite end of said second element rigidly joined face-to-face with an end of said third element in a second fused joint, said fourth element rigidly joined face-to-face to the outside surface of a plug member at a third fused joint, said plug member rigidly joined to the second end of said tubular member, with at least a substantial portion of said fourth member disposed inside said tubular member, and the corresponding end portions of said third and fourth elements rigidly joined face-to-face at a fourth fused joint.

12. The actuator of claim 1 wherein said first enclosing element has a high coefficient of thermal expansion relative to at least some of the other elements, said connection between said third and fourth elements constituting a heat fused connection serving to unify the assembly, said connection spaced substantially from said high coefficient of expansion enclosing element.

13. The actuator of claim 10 wherein said joined ends of said third and fourth elements are joined by heat fused means spaced substantially from said high coefficient of expansion tube, and located at a predetermined point relative to said tube at a predetermined temperature of said tube.

References Cited by the Examiner

UNITED STATES PATENTS

| 1,030,857 | 7/1912 | Alexander | 73—363.3 |
| 2,660,646 | 11/1953 | Fritzinger | 73—363 |
| 2,734,968 | 2/1956 | Cooper | 200—137 |

LOUIS R. PRINCE, *Primary Examiner.*

DONN McGIEHAN, *Assistant Examiner.*